(12) United States Patent
Gannon et al.

(10) Patent No.: US 7,160,441 B2
(45) Date of Patent: Jan. 9, 2007

(54) URBAN RUNOFF WATER TREATMENT METHODS AND SYSTEMS

(75) Inventors: Guy Timothy Gannon, Bakersfield, CA (US); Joseph Charles Gannon, Bakersfield, CA (US)

(73) Assignee: Clear Creek Systems, Inc., Bakersfield, CA (US)

(*) Notice: Subject to any disclaimer, the term of this patent is extended or adjusted under 35 U.S.C. 154(b) by 401 days.

(21) Appl. No.: 10/112,181

(22) Filed: Mar. 29, 2002

(65) Prior Publication Data

US 2003/0024863 A1  Feb. 6, 2003

Related U.S. Application Data

(60) Provisional application No. 60/280,552, filed on Mar. 29, 2001.

(51) Int. Cl.
 *B01D 36/00* (2006.01)
 *C02F 9/00* (2006.01)

(52) U.S. Cl. .............. 210/134; 210/143; 210/192; 210/202; 210/241; 210/259; 210/266; 210/277

(58) Field of Classification Search ............ 210/663, 210/668, 669, 747, 748, 760, 143, 170, 241, 210/266, 275, 290, 134, 192, 202, 259, 277
See application file for complete search history.

(56) References Cited

U.S. PATENT DOCUMENTS

| | | | |
|---|---|---|---|
| 434,571 A | 8/1890 | Sargent | 210/259 |
| 5,092,993 A | 3/1992 | Goodwin | 210/202 |
| 5,120,435 A | 6/1992 | Fink | 210/192 |
| 5,147,532 A | 9/1992 | Leek, Jr. | 210/97 |
| 5,178,755 A | 1/1993 | LaCrosse | 210/195.1 |
| 5,190,659 A | 3/1993 | Wang et al. | 210/663 |
| 5,322,623 A | 6/1994 | Benskin et al. | 210/195.1 |
| 5,346,617 A | 9/1994 | Costello | 210/192 |
| 5,350,527 A | 9/1994 | Kitko | 210/804 |
| 5,376,281 A | 12/1994 | Safta | 210/748 |
| 5,384,032 A | 1/1995 | de Souza | 210/104 |
| 5,393,417 A | 2/1995 | Cox | 210/96.1 |
| 5,466,425 A | 11/1995 | Adams | 422/186.3 |
| 5,512,178 A | 4/1996 | Dempo | 210/638 |
| 5,547,584 A | 8/1996 | Capehart | 210/669 |
| 5,626,748 A | 5/1997 | Rose | 210/241 |
| 5,647,977 A | 7/1997 | Arnaud | 210/167 |
| 5,651,894 A * | 7/1997 | Boyce et al. | 210/652 |
| 5,704,989 A | 1/1998 | Page | 134/10 |
| 5,707,527 A * | 1/1998 | Knutson et al. | 210/660 |
| 5,730,878 A * | 3/1998 | Rice | 210/662 |
| 5,897,297 A | 4/1999 | Carter | 417/46 |

(Continued)

Primary Examiner—Ivars C. Cintins
(74) Attorney, Agent, or Firm—Bingham McCutchen LLP

(57) ABSTRACT

The apparatus and methods of the present invention enable efficient and appropriate treatment of Urban Water Runoff, so that the treated Urban water Runoff can be can be introduced into public waterways without contaminating such waterways. The system apparatus utilizes adsorptive Organoclay media, mechanical filtration and ultraviolet sterilization. The methods and apparatus of the present invention remove contaminants from Urban Water Runoff to a level which enable the resulting effluent to meet appropriate standards for introducing the treated Urban water Runoff in to public waterways. The method and apparatus of water treatment of the present invention does not utilize chlorine containing compounds which, when combined with organic compounds can produce THM's that can become problematic when re-introduced to the downstream environment. The systems of the present invention can be made sufficiently compact so as to enable their use in remote locations.

10 Claims, 6 Drawing Sheets

U.S. PATENT DOCUMENTS

| | | | |
|---|---|---|---|
| 5,908,550 A | 6/1999 | Kaipainen | 210/167 |
| 6,080,319 A | 6/2000 | Alther | 210/679 |
| 6,197,203 B1 | 3/2001 | Ishida et al. | 210/748 |
| 6,200,484 B1 | 3/2001 | McInnis | 210/693 |
| 6,235,201 B1 | 5/2001 | Smith et al. | 210/691 |
| 6,264,836 B1 | 7/2001 | Lantis | 210/188 |

* cited by examiner though the use of ultraviolet light.
URBAN RUNOFF WATER TREATMENT METHODS AND SYSTEMS This application claims priority on U.S. provisional application No. 60/280,552, filed Mar. 29, 2001, and entitled, "Urban Water Runoff Treatment System." The disclosure of the foregoing is incorporated by reference herein as if set forth in full hereat.

FIELD OF INVENTION

The field of the present invention relates to methods and apparatus for limited reconditioning of Urban Water Runoff.

BACKGROUND OF THE INVENTION

Since the beginning of time, there has existed a need for the treatment of water containing waste materials and byproducts. As civilization has advanced, this need has become more acute. To respond to these needs, waste water is diverted to large scale water treatment plants through expensive and often obtrusive systems of sewers and open waterways. Untreated water often ends up in public waterways which can have adverse health and ecological consequences. These problems are compounded by Urban Water Runoff.

Urban Water Runoff results from domestic, industrial and commercial area surface water flows. The flow of Urban Water Runoff, however, is not consistent and can be unpredictable. Sources of water include precipitation, wash-down, irrigation, fire fighting, broken water lines, natural disasters, and the widespread every day events which can not be named in an all encompassing list, but include things such as watering a lawn and washing a car. Urban Water Runoff is the water that everyone uses or sees that is not traditional sewage and is typically not treated before it is discharged into the environment.

In urban areas, the surface can be substantially impermeable by water due to things such as paving, natural conditions (e.g. soils containing a high concentration of clay or other natural materials which inhibit ground percolation) and circumstances where percolation through the ground is inadequate to purify the water.

Urban areas have substantially developed areas wherein materials that form pollutants are used, such as grease and oils from machinery (including automobiles) and pesticides and fertilizers are used. Contaminant sources can include golf courses, city streets and parking lots. Due to these factors, Urban Water Runoff often contains contamination harmful to the environment, making it necessary to treat the water prior to its discharge. The need for Urban Water Runoff treatment is particularly appropriate in areas where water may initially contain a single contaminant or a low level of a variety of contaminants and the, as a result of its flow across contaminated surfaces, may actually become additionally contaminated. This effect is referred to herein as plume expansion.

Typically, contaminant loading of Urban Water Runoff includes elevated levels of hydrocarbons, silts, trash, fertilizers, bacteria, pesticides, human and animal waste, pesticides, bacterial and viral pathogens. In addition, Urban Water Runoff can include unusually high total and fecal coliform. Waste contained in this form of untreated discharge has an enormous environmental impact on inland waterways and near shore ocean discharge systems due to the bacterial content of the discharge material.

Overall water flow levels, and the need for additional waste water treatment, continually increases. In an urban area, most of the runoff is, by design, collected through a system of gutters and storm drains. This infrastructure can be overwhelmed by unpredictable Urban Water Runoff flow caused by storms or other circumstances. Often times tributaries to large bodies of water have historically been used as a flow path, but restrictions on the ability to do so are arising out of a desire and need to avoid the introduction of contaminants into these bodies.

Thus, the only alternatives are to either divert the Urban Water Runoff through channels, sewers and the like where it combines with ordinary sewage or find a way to treat the Urban Water Runoff before it reaches these waterways to avoid the contamination of these waterways by the contaminated Urban Water Runoff. If Urban Water Runoff can be treated before it reaches the tributary bodies, it can reduce the spread of contaminants from the Urban Water Runoff and allow the continued use of the public waterways to avoid the overwhelming of traditional water treatment facilities. The traditional approach to water treatment of building large and unsightly treatment facilities, and the infrastructure of sewers and the like to support this solution, is expensive and inefficient. Thus, the present invention enables the efficient treatment of Urban Water Runoff while protecting the both the physical and aesthetic environments in the process.

SUMMARY OF THE INVENTION

The methods and apparatus of the present invention are designed to remove contaminants from Urban Water Runoff to a level which enable the resulting effluent to meet acceptable standards for the discharge of Urban Water Runoff into open waterways. Currently, that standard is safe for human contact, but the present invention is not limited to any particular standard.

The apparatus and methods of the present invention utilizes:

a. Turbidity and Total Suspended Solid (TSS) reduction of the bulk wastewater effluent by utilization of selected mechanical filtration methods;

b. Adsorptive separation of certain contaminants in the bulk wastewater (particularly hydrocarbon contaminants); and, c. Significant reduction of bacterial and virus contamination by utilization of a sterilization process, preferably through the use of ultraviolet light.

In the preferred embodiment, the systems and methods of the present invention also use a programmable logic controller to actuate various functions and features of the present invention. Manual operation of the system is feasible, possible and envisioned in the present invention.

The method and apparatus of water conditioning of the present invention do not utilize chlorine containing compounds which, when combined with organic compounds can produce THM's that can become problematic when re-introduced to the downstream environment.

As such, it is an object of the present invention to provide an apparatus and methods for conditioning Urban Water Runoff so as to make the resulting effluent dischargable into public waterways under applicable standards.

It is a further object of the present invention to introduce a solution for treating Urban Water Runoff in the runoff water flow path in a manner which intercepts Urban Water Runoff and allows it to be treated and routed through public waterways consistent with applicable standards to protect the physical and aesthetic environment.

Other and additional objects of the present invention shall be apparent to one of ordinary skill in the art from the disclosures contained herein.

DETAILED DESCRIPTION OF THE INVENTION

Figure 1:
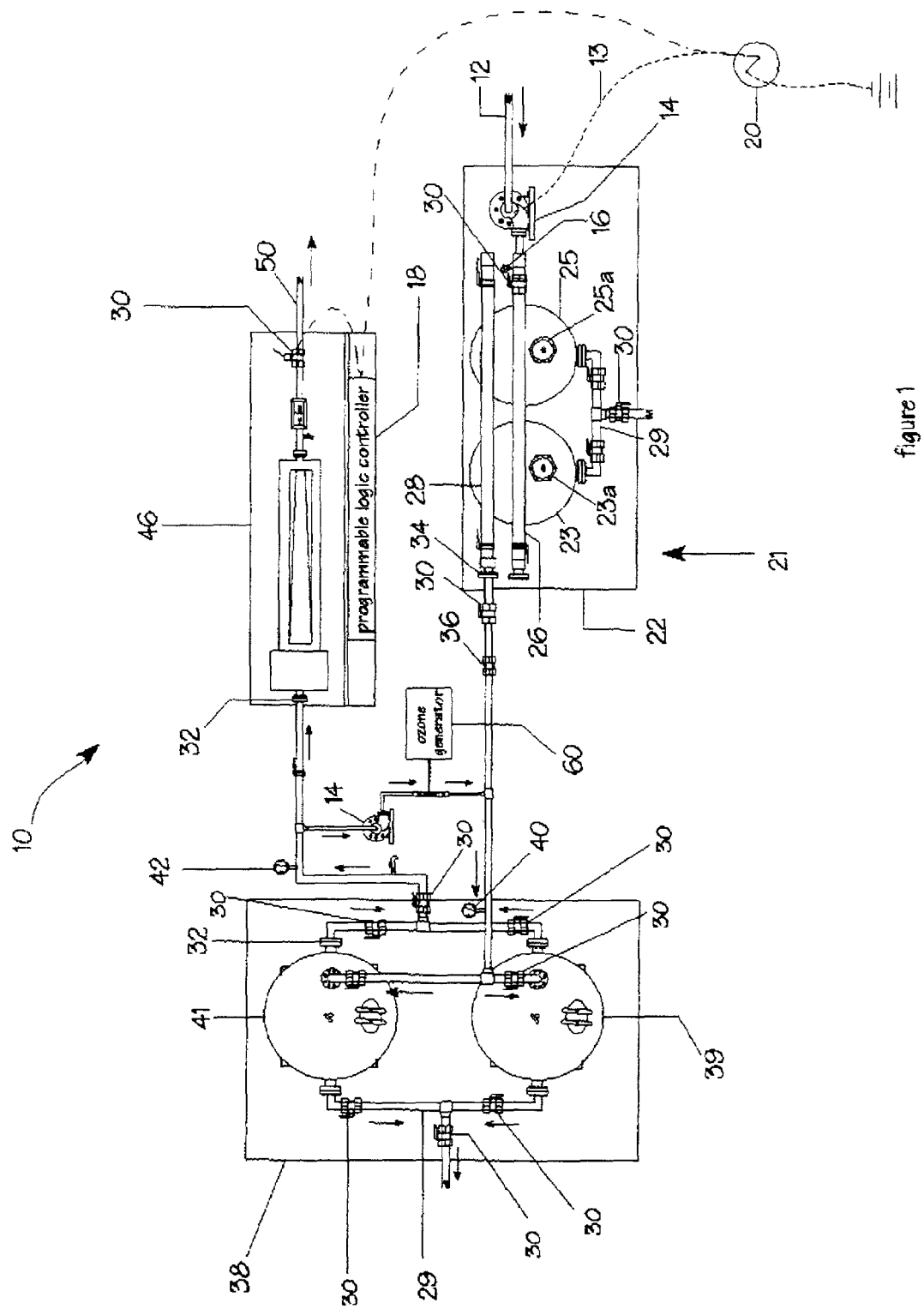
FIG. 1 is a schematic drawing showing the first preferred embodiment of the present invention.

Referring to the figures, the apparatus and methods of the present invention can provide the treatment of Urban Water Runoff wastewater required for inland waterway discharge, ocean outfall or for feeding to a publicly owned treatment works system. The following discussion provides a description of the components of the preferred embodiments of the present invention as represented in the associated drawings, a description of the component function, and a step by step review of the system of the preferred apparatus and methods. As will be understood by one of ordinary skill in the art, the disclosure describes the preferred embodiments of the present invention. Component changes and substitutions can be made to those disclosed herein without departing from the inventive aspects and spirit of the present invention. Thus, the scope of the present invention cannot be limited to the specifics set forth herein.

Raw influent can be collected in a variety of ways for feeding into the system of the present invention. While not shown in the drawings, raw influent can be collected in a holding tank, catch basin, or alternatively intercepted from the bulk stream-flow with a submerged, screened pipe and stilling well chamber of typical design and construction, each of which are well known processes and procedures.

The influent (i.e., the water under treatment) enters the system 10 of the first preferred embodiment of the present invention through a raw water inlet 12 and is transferred to the system components via a first pump 14. The first pump 14 is preferably a centrifugal pump includes a semi-open impeller and abrasion resistant packing seals so that sediment and small solids up to ¼" can easily pass without clogging the pump.

As will be understood by one of ordinary skill in the art, the capacity and horsepower rating of the pump 14 can be determined by the system flow rate and static head loss between the storage tank (or stilling well) elevation and the elevation of the system 10 equipment. The size and number of pumps 14 used in a system of the present invention should be sufficient to produce a minimum dynamic pressure of approximately 40 psi at the inlet gauge 16 of the mechanical particulate filter 21.

While the system of the present invention can be manually controlled and operated, each of the preferred embodiments described herein are described with the use of a programmable logic controller ("PLC") 18 and a plurality of electronic control valves 30 as will hereinafter be described. In systems utilizing an influent storage tank or stilling well, the actuation of pump 14 is preferably controlled by a float switch arrangement (not shown) located in the influent storage tank or stilling well. The float switch sends a signal to the programmable logic controller ("PLC") 18, if one is present—otherwise to a notification device (such as a light), indicating that sufficient water is present in the tank or stilling well. If the PLC 18 determines that the system 10 is ready for operation, (e.g. no alarms or high level in the effluent tank) the PLC 18 provides a start signal to the starter 20 in the pump 14. The electrical contacts in the starter 20 are then closed (either electronically or manually) and provide electrical power to the pump 14 through line 13. Likewise, when the level in the influent storage tank drops below a field adjustable set point, the float switch sends a stop signal to the PLC 18 (or the notification device), which results in (or signals for) the opening of the contacts in the starter 20, thereby removing power to the pump 14.

In this preferred embodiment, the mechanical particulate filter 21 is a mixed bed multi-media filter 22. The multi-media filter 22 contains at least one, and in the preferred embodiment, a two vessel array 23,25, to enable the system 10 to maintain an adequate flow rate. As will be understood by one of ordinary skill in the art, the size and number of the vessels 23,25 can be determined from the overall system flow rate and will vary depending on the influent quality. Generally, the size of the filter will preferably allow for a hydraulic loading rate of 4–12 gpm per square foot of filter bed surface.

In the first preferred embodiment 10, each of the pressure vessels 23,25 in the multi-media filter array 22, includes a pressure relief valve thereon 23a, 25a, respectively. In addition, the multi-media filter array 22 preferably includes an inlet manifold 26 and an outlet manifold 28. The water under treatment flows through the inlet manifold 26 through one of the multi-media filter vessels (23,25) and then exits through the outlet manifold 28. In addition, the array 22 also preferably includes a backwash line 29 through which the filter vessels 23,25 can be backwashed.

Each of the vessels 23,25 are preferably constructed of epoxy coated steel and conform to ASME pressure code vessel requirements. The exterior of the vessels 23,25 have an industrial coating resistant to sunlight, chemical attack, and mechanical damage. In the preferred embodiment, the vessels 23,25 are rated for approximately 100 psi working pressure.

Control Valves 30 are interposed through the system, including upstream of the inlet manifold 26, downstream of the outlet manifold 28 and in the backwash line 29 to regulate the operation of the multi-media filter array 22 in this preferred embodiment. In an embodiment with a PLC 18, the control valves 30 are preferably reversible electrically actuated industrial control valves. The control valves preferably include position indicators, manual overrides, and fail safe operation. The valves also preferably include PVC/polypropylene construction with EPDM seats and stainless steel shaft construction. The gear train is preferably permanently lubricated and environmentally sealed. The PLC 18 is connected to said control valves 30 throughout the system so as to enable the PLC to actuate such valves and control the system operation manual valves can alternatively be used where the PLC is not provided or necessary.

Likewise, back flow valves 36 are interposed throughout the system in order to ensure that the water under treatment does not backup and harm the system components or improperly discharge untreated Urban Water Runoff through a backwash valve or the influent inlet 12. Similarly, inlet and outlet pressure gauges are also disposed throughout the system of the present invention so as to enable the monitoring of pressure through each of the filters and other components for maintenance (including backwashing) purposes.

The inlet and outlet manifolds (26, 28) and the backwash line 29 are preferably PVC schedule 80 UV inhibited piping terminating in 150# standard Flange connections 32. Filter service, backwash and rinse functions of these components (like each of the components in the system of the present invention) are preferably controlled by the system PLC 18, but can be done manually.

The media contained in the vessels 23,25 provides a highly efficient and economical method for removal of suspended particulate from raw water sources. In the preferred embodiment, the multi-layered filtration material includes: Unigrain 85, a spherical based crystalline silica; Unigrain 55, an almandite gemstone high retention garnet; and, Unifil 475, a graded support material.

Monitoring the pressure differential provides information about when the multi-media filter 22 should be cleaned, backwashed or replaced. A stainless steel liquid filled inlet pressure gauge 16 and outlet pressure gauge 34 for determining filter performance is thus also provided. If automated operation is desired, optional differential pressure switches (not shown) can initiate filter backwash operation through the backwash line 29. Periodic backwashing of the media bed insures complete utilization of the bed layers, maximizing bed life and minimizing operational costs associated with bed replacement. Suspended solid removal in this phase of treatment enhances the performance of the downstream adsorptive bed and disinfecting systems. Backwash effluent from this embodiment of the present invention can be routed to sanitary sewer discharge or recycled to the influent inlet 12.

After exiting the outlet manifold 28, the water under treatment will preferably flow through an adsorptive media pressure filter 38. The adsorptive media pressure filter 38 preferably includes at least one and as illustrated in FIG. 1, preferably 2, pressure filter vessel 39,41 similar in construction to the multi-media filter vessels 23,25 described above. The preferred media for the adsorptive media pressure filter 38 is EC-100, which is a granular, organically modified clay filtration material. The EC-100 media is superior as it is designed for removal of emulsified oil and grease, large molecular weight chlorinated hydrocarbons and heavy metals. A carbon media is an acceptable, and generally less expensive alternative, although EC-100 can remove water-soluble organics with up to seven times greater efficiency than carbon filtration.

The adsorptive media pressure filter 38 is preferably provided with an inlet and outlet pressure gauges (40, 42). It is recommended that backwashing be performed periodically and particularly when the pressure differential between the inlet and outlet of the adsorptive media pressure filter 38 reaches approximately 40 psi to ensure long life and proper operation. Periodic manual bed inflation with air and/or clean water will extend the life of the media charge by exposing new sites to the bulk water flow for continued adsorption.

In this preferred embodiment, the water under treatment is lastly treated by ultraviolet irradiation in an ultraviolet light chamber 46. The specific wavelength of ultraviolet irradiation used can be determined by the quality of the influent stream as will be understood by one of ordinary skill in the art. A single or dual wavelength ultraviolet chamber 46 may be employed to treat the water under treatment to reduce elevated levels (i.e., levels above the level desired by the system operator or applicable standard) of bacteriological and virus contaminants through bacteriological and virus destruction and/or decomposition of low weight organics.

The flow rate and chamber design can vary depending on the filtration system 10 processing rate and the quality of the influent, and can be determined by conventional means. Nonetheless, the ultraviolet chamber 46 of the present invention utilizes energy efficient ballasts, 304 stainless steel chamber construction and ultraviolet intensity and alarm sensors to signal the PLC 18 unit for operation notification. Upon exiting the ultraviolet light chamber 46, the treated Urban Water Runoff 50 can be discharged to an open water way.

In use, the present invention is designed to treat Urban Water Runoff containing elevated levels of contaminants typically found in such runoff. The present invention, thus, avoids contamination of public waterways into which Urban Water Runoff typically flows and enables the use of these waterways to avoid overloading typical sewage treatment systems. Additional steps, can also be employed with the system 10 of the first preferred embodiment to increase its efficiency, reduce its operations, costs and/or vary the quality of the treated Urban Water Runoff 50 produced by the system 10.

For example, as is shown in FIG. 1, the system 10 may optionally include a mixed oxidant injection system 60. The mixed oxidant injection system 60 preferably side-streams the adsorptive media beds 38. During periods of system non-use or non-treatment of the bulk water influent, this stand-by system can provide strong oxidation of biological and chemical wastes that may have accumulated on the filtration surfaces and which might otherwise putrefy during periods of system stagnation.

Sizing of the components for this ozone system 60 depends on the overall filtration system 10 design flow rate as will be understood be one of one of ordinary skill in the art. Nonetheless, the system of the preferred embodiment includes a Power Pro air preparation dryer/oxygen concentrator and an optional oxygen feed system for enhanced ozone production capacity. The mixed oxidant system 60 also preferably incorporates micro-bubble diffusion technology with the use of Mazzi Injectors and discharge nozzle components, and a preferably a pump 14 to assist in the process. The air/ozone ratio in the preferred embodiment is adjustable to maximize the performance level up to a 4:1 air/ozone ratio by volume.

While each of the filtration pumps, valves, sensing devices and regulating components described in each of the preferred embodiments above and below can be operated manually, they are preferably controlled by a PLC 18. The preferred embodiment of the PLC is a Direct Logic brand PLC control system, but any brand of controller having the capabilities set forth herein may be substituted therefore without departing from the spirit and scope of the present invention. The PLC 18 will preferably have output capabilities for specific level and flow 4–20 mA loops. In addition, an RS232 serial connection port allows for remote monitoring and control of the plant with the addition of a modem and telephone line, from any appropriate computer anywhere in the world. Specifically, the PLC 18 unit preferably features: NEMA 4X fiberglass weather-tight construction, MMI interface featuring 2 lines of "real English" plant operating parameters, manual and automatic control of major system components via traditional HOA switches and indicator lights, integrated, sequential, orderly shut down Emergency Stop switches located on the panel and at two strategically placed locations within the plant and paper and disk forms of program documentation.

All media filters of the preferred embodiments (discussed above and below) of the present system 10 are preferably provided with a backwash site glass flanged spool. This will enhance the operation of the system 10 by allowing the operators the ability to monitor backwash water flow and turbidity. Additionally, the operator can verify operation and monitor each filter for media dissipation during backwash, which is indicative of filter internal problems. Optional differential pressure switches on the media filters are also preferably provided to enable automatic filter backwash operation. Sample valves are preferably included on all filter effluent piping to allow for easy operator collection for testing and logging of system operations. A resetable flow meter on the effluent discharge piping coupled with an electrically operated throttling valve are also provided in the preferred embodiment to maintain the filtration system design flow rate throughout variations in filter loading. Additionally the flow meter display allows the operator to log performance and determine cost of operation.

Figure 2:
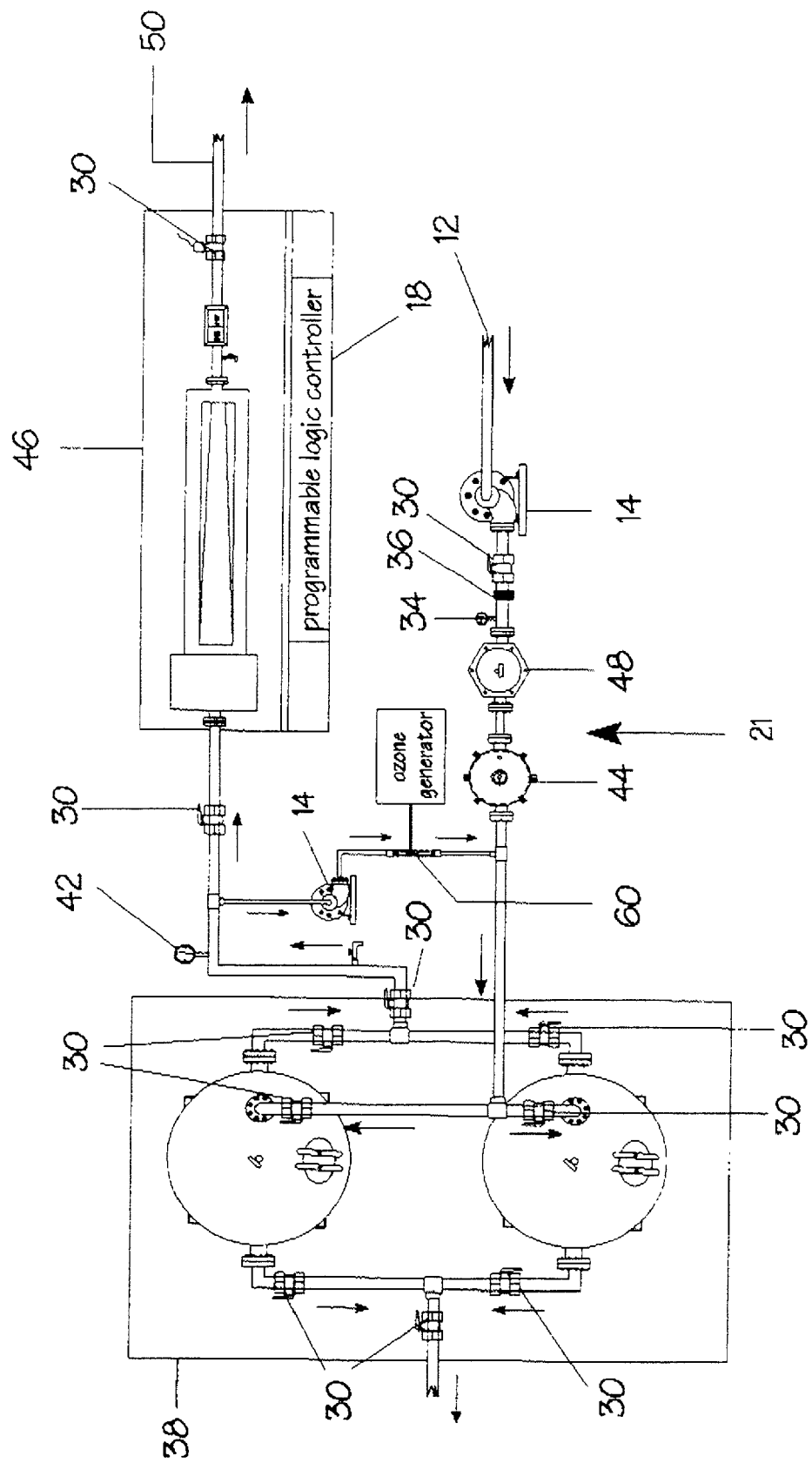
FIG. 2 is a schematic drawing showing a second preferred embodiment of the present invention.

A second preferred embodiment of the present invention is depicted in the figures, and most particularly in FIG. 2. In this preferred embodiment, the mechanical particulate filter 21 is preferably a combination of a string wound particulate filter 44 and a removable bag filter 48. The removable bag filter 48 preferably has two filtration elements for reducing any elevated levels of particulate matter which might be present in the water under treatment. As will be understood by one of ordinary skill in the art, the number of filtration elements (i.e., 1 or 2 or more) will depend on the flow rate the system of the present invention is anticipated to handle. While FIG. 2 shows both a string wound particulate filter 44 and a removable bag filter 48, either type of filter can be used alone in appropriate circumstances as will be understood by those of skill in the art. The filter devices depicted in FIG. 2 are superior to the mixed media bed particulate filter of an earlier preferred embodiment where issues of cost and size are particularly in issue. The remainder of the second preferred embodiment is substantially the same as the first preferred embodiment, and will not be described again in detail. Rather, the above disclosure relating to the first preferred embodiment is incorporated herein.

Figure 3:
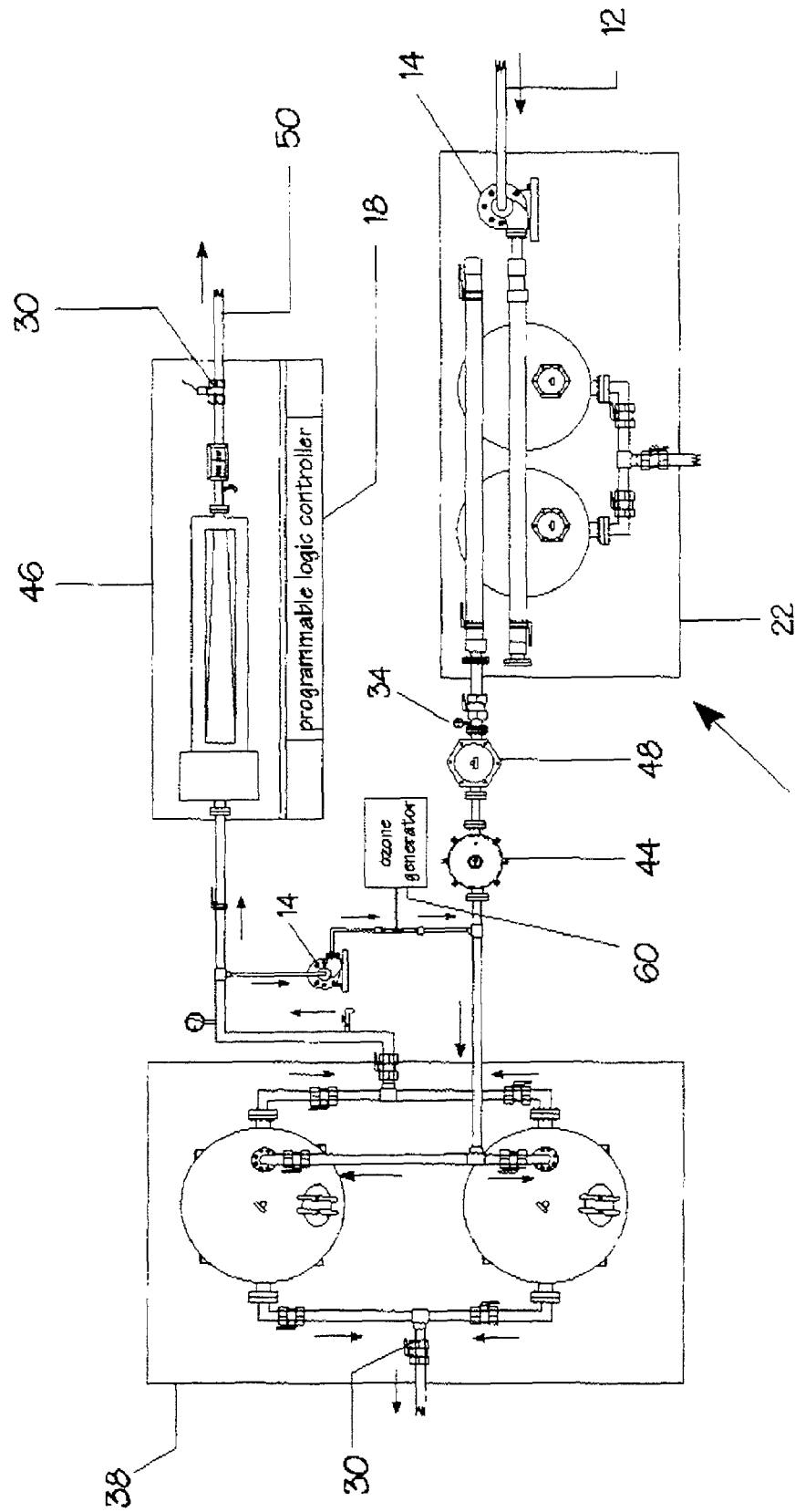
FIG. 3 is a schematic drawing showing a third preferred embodiment of the present invention.

A third preferred embodiment of the present invention is illustrated in the figures, and most particularly in FIG. 3. As will be clear to one of ordinary skill in the art, the third preferred embodiment is a combination of the first and second preferred embodiments described above. The advantage of utilizing both a mixed media bed particulate filter together with either or both of a string wound particulate filter 44 and a replaceable bag particulate filter 48 is the further reduction in particulate matter together with the ability to extend the life of all of the filter elements by utilizing such a combination. Again, as with the second preferred embodiment, the remaining elements of the third preferred embodiment do not differ substantially from those described in conjunction with the first and second preferred embodiments, and thus, will not be described again herein. Instead, the above disclosures with regard to the first and second preferred embodiments are incorporated herein by reference.

Figure 4:
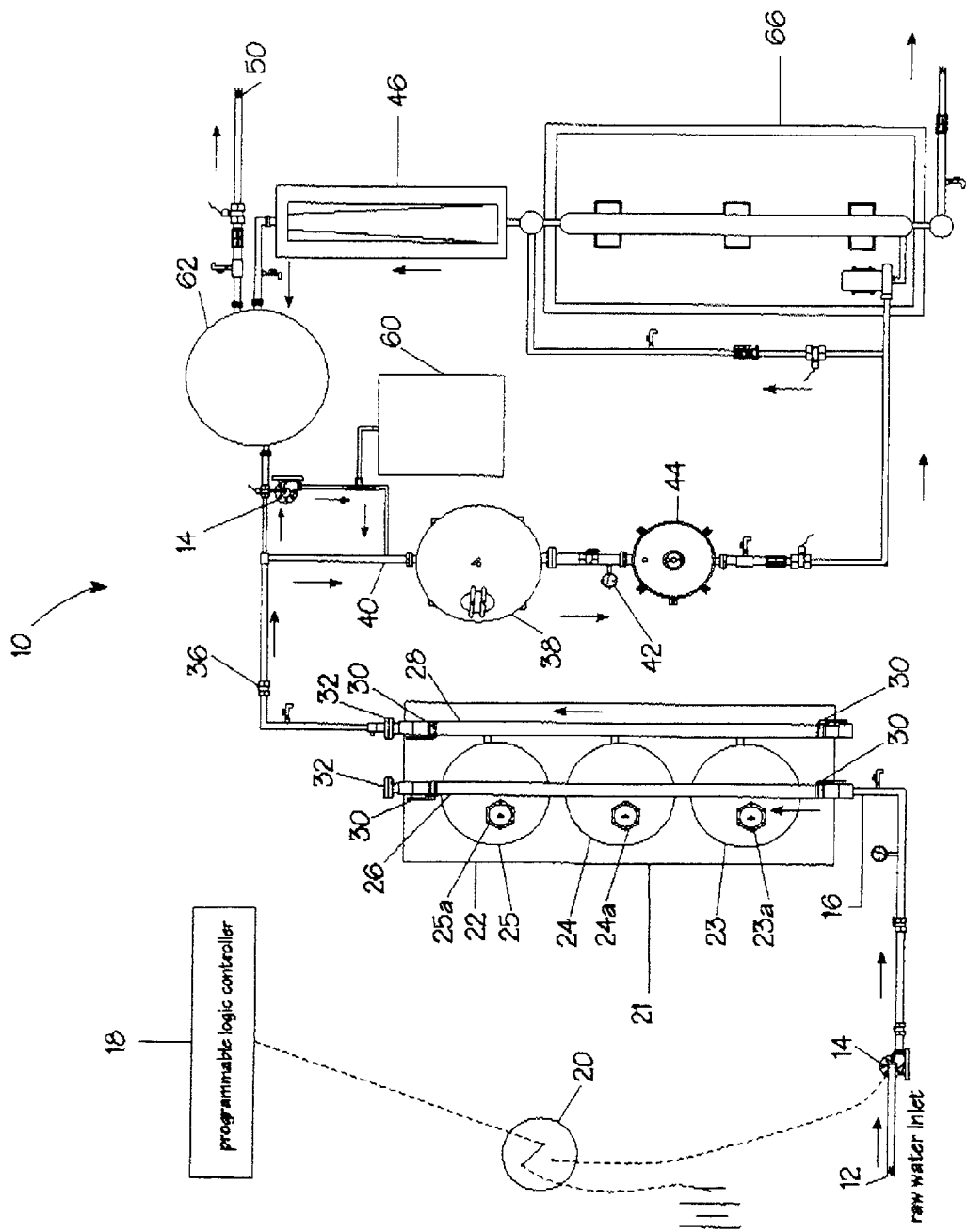
FIG. 4 is a schematic drawing showing a fourth preferred embodiment of the present invention.

A fourth preferred embodiment of the present invention is illustrated in FIG. 4. In this preferred embodiment, the mixed bed media filter includes three vessels 23, 24, 25, each having a pressure relief valve therein, 23A–25A. Otherwise, the mixed bed media filter does not differ substantially from the multimedia filter 22 described in conjunction with the first preferred embodiment as was described above, the contents of which are incorporated herein by reference. In addition, a string wound particulate filter 44 is utilized in the system of the fourth preferred embodiment after the adsorptive media filter 38. This placement also assists in preserving the life of the various components and reducing any elevated levels of particulate matter in the water under treatment.

In addition, this fourth preferred embodiment has a clean water tank 62, which can be filled from the outlet of the ultraviolet chamber 46. By circulating clean water from the water tank 62 with the oxidation materials from the oxidation system 60 substantial oxidative properties, the filtration equipment is kept in a "fresh" and ready stand-by status during periods of off use. Clean water is drawn from the effluent tank 62, infused with the air/ozone gas solution, and circulated within the system 10 filtration equipment. A single pump 64 provides motive force for circulation and aeration development. The pump 64 is sized for a flow rate based on the filtration train size. The PLC 18 unit also controls the stand-by system 60.

In this preferred embodiment, a reverse osmosis membrane system 66 is also provided. The inclusion of a reverse osmosis system enables the apparatus and method of the present invention to produce water which meets the various governmental standards for reclaimed and/or recycled water in applications where such purification is desired.

Figure 5:
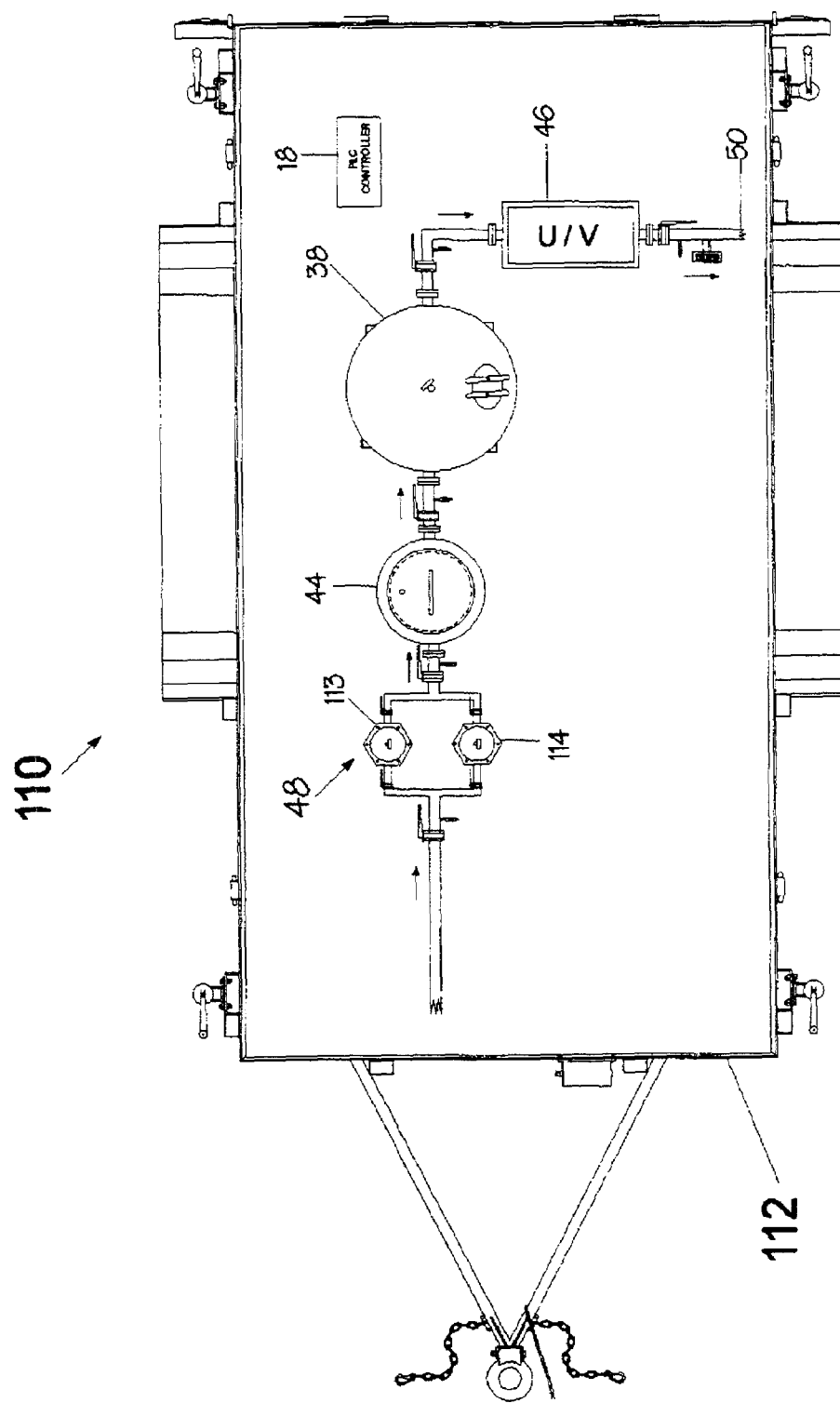
FIG. 5 is a schematic drawing showing a fifth preferred embodiment of the present invention; and, FIG. 6 is a schematic drawing showing a sixth preferred embodiment of the present invention.
Figure 6:
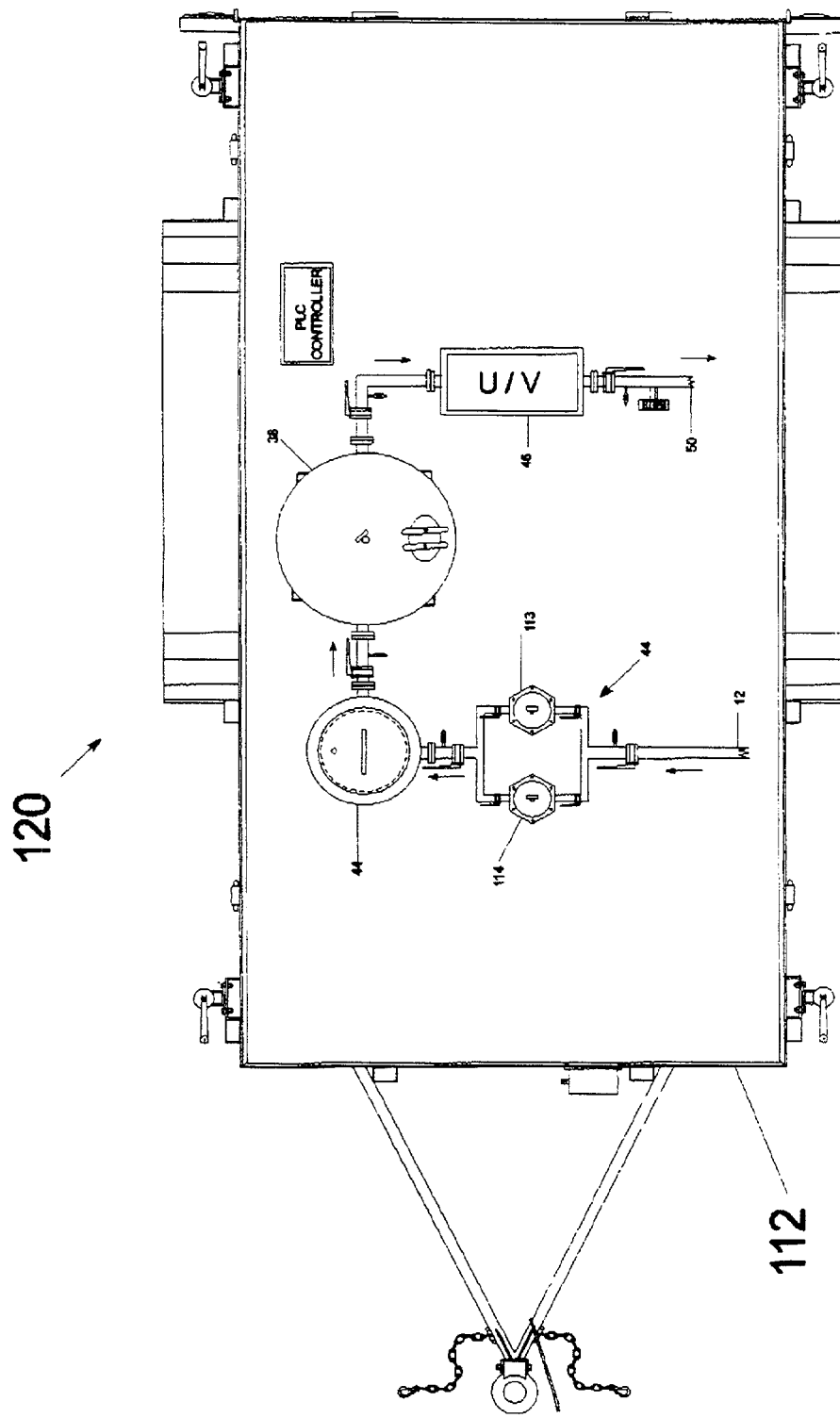

A fifth and sixth preferred embodiments of the present invention are also illustrated in the figures, and most directly in FIGS. 5 and 6, respectively. The fifth preferred embodiment 110 preferably utilizes a bag filter 48 having two filter elements therein 113, 114. In addition, this fifth preferred embodiment 110 also preferably uses a string wound particulate filter 44 and an adsorptive media filter 38 and an ultra violate light chamber 46 as described above. This preferred embodiment, however, is arranged to be transportable for field use as the components are mounted onto a trailer 112. A PLC 18 is also provided so as to interact with the various components of this fifth preferred embodiment 110. As is illustrated in FIG. 5, this preferred embodiment of the present invention is arranged to sit on a flat bed trailer of approximately 24 feet in length.

The sixth preferred embodiment 120 is, as is illustrated in the figures but most directly in FIG. 6, a variation on the arrangement of the fifth preferred embodiment 110 but which is designed to be even more compact than the fifth embodiment 110. The flow rate achievable by the sixth embodiment 120 is lower than for the fifth embodiment 110 but its compact size allows it to be used in off site locations which cannot accommodate the larger sized versions.

As indicated above, one of the particular strengths of the present invention is the ability to be deployed in circumstances where it can intercept Urban Water Runoff which historically has, or may in the future, be diverted to public waterways. Plume contamination is becoming an ever greater problem giving the increased urbanization found in many highly populated areas. Accordingly, the present invention can applied in a manner to intercept the Urban Water Runoff, treat that runoff, and discharge the runoff into public waterways. This provides the advantage of maintaining the ecological balance in these public waterways while avoiding the need for comprehensive sewage treatment facilities, additional transportation mechanisms (such as sewers and gutters to transport Urban Water Runoff to traditional sewage treatment facilities). The implementation of the present invention thus provides an economical way in which to treat the problems presented by Urban Water Runoff in an affordable and efficient manner over conventional alternatives. Moreover, its design and construction allows for the present invention to be deployed in field environments which enables the capture (i.e. interception) of Urban Water Runoff in the locations necessary to maximize the advantages of the present invention.

The prior art alternatives to the present invention all involve complicated infrastructure together with expensive and unsightly treatment facilities. In direct contrast to these circumstances, applicant's invention enables municapalities and other entities responsible for the preservation of the environment and the treatment of contaminated water to fulfill those obligations as it relates to Urban Water Runoff in a cost effective and efficient manner.

We claim:

1. A system for treating Urban Water Runoff, said system comprising:
    a water inlet and a water outlet, said inlet being arranged to allow water under treatment to enter the system, said outlet being arranged to allow treated water to exit the system;
    a mixed media bed particulate filter, said mixed media bed particulate filter having a backwash line,
    an adsorptive media filter, said adsorptive media filter having a backwash line,
    an ozone generator, said ozone generator being arranged in side stream with said adsorptive media filter,
    an ultraviolet light disinfectant chamber at the water outlet,
    a plurality of electronic control valves, and
    a programmable logic unit, said programmable logic unit being electronically connected to said electronic control valves, said electronic control valves and said programmable logic unit being interoperable so as to control the flow of water under treatment through the system.

2. A system as set forth in claim 1, the ozone generator oxygenating a portion of the water under treatment, said electronic control valves being interposed between said ozone generator and said adsorptive media filter for controlling flow of oxygenated water under treatment to prevent bio-fouling of said adsorptive media filter.

3. The system of claim 2, wherein an electronic control valve is disposed between said mixed media bed particulate filter and said adsorptive media filter.

4. The system of claim 2, an electronic control valve being positioned in the backwash line of the adsorptive media filter and being interoperable with said programmable logic controller to permit said programmable logic controller to automatically backwash the adsorptive media filter.

5. A system for treating Urban Water Runoff of claim 1, wherein said system is arranged on a trailer to permit periodic use of said system.

6. A system for treating Urban Water Runoff of claim 1, said mixed media bed particulate filter containing a spherical based crystalline silica; an almandite gemstone high retention garnet; and a graded support material.

7. The system of claim 1, wherein said adsorptive media filter includes an organoclay media.

8. A system for treating Urban Water Runoff for submission into public waterways, comprising:
    a water inlet, said inlet being arranged to allow the water to enter the system;
    a mechanical filter, said mechanical filter being arranged to reduce any elevated level of particulate matter in the water;
    an adsorptive media filter, said adsorptive filter containing an organoclay media and being arranged to reduce any elevated level of hydrocarbon contaminants in the water;
    a sterilizer, said sterilizer being arranged to reduce any elevated levels of viral and bacterial contaminants in the water;
    a programmable logic unit, said programmable logic unit being arranged to control the actuation of the mechanical filter, adsorptive media filter and sterilizer;
    an ozone generator, said ozone generator arranged to operate in side stream with said adsorptive media filter to avoid bio-fouling of said adsorptive media filter; and
    a water outlet, said outlet being arranged to allow the treated water to exit the system.

9. The system of claim 8, said mechanical filter being a string filter.

10. The system of claim 8, said mechanical filter being a replaceable bag filter.

* * * * *